United States Patent [19]

Coyle et al.

[11] Patent Number: 5,455,105
[45] Date of Patent: Oct. 3, 1995

[54] ACRYLIC COATED POLYCARBONATE ARTICLE

[75] Inventors: Dennis J. Coyle, Clifton Park, N.Y.; Earl T. Crouch, Evansville; Dimitris Katsamberis, Mt. Vernon, both of Ind.; Stuart R. Kerr, III, Troy; Larry N. Lewis, Scotia, both of N.Y.

[73] Assignee: General Electric Co., Pittsfield, Mass.

[21] Appl. No.: 146,274

[22] Filed: Oct. 29, 1993

Related U.S. Application Data

[62] Division of Ser. No. 482,438, Feb. 20, 1990, Pat. No. 5,271,968.

[51] Int. Cl.⁶ .............................. B32B 27/36; B05D 3/06
[52] U.S. Cl. .................... 428/215; 428/331; 428/334; 428/409; 428/412; 428/522; 428/913
[58] Field of Search .................... 428/412, 334, 428/522, 409, 215, 331, 913

[56] References Cited

U.S. PATENT DOCUMENTS

| | | |
|---|---|---|
| 3,607,380 | 9/1971 | Thams . |
| 3,655,481 | 4/1972 | Hall . |
| 3,658,620 | 4/1972 | Hall . |
| 3,666,591 | 5/1972 | Hall et al. . |
| 3,669,796 | 6/1972 | Hall et al. . |
| 3,689,346 | 9/1972 | Rowland . |
| 3,050,269 | 9/1977 | Mayer . |
| 4,057,657 | 11/1977 | Garnett et al. . |
| 4,173,490 | 11/1979 | Rotenberg et al. . |
| 4,198,465 | 4/1980 | Moore et al. . |
| 4,267,215 | 5/1981 | Riggs . |
| 4,295,907 | 10/1981 | Cordts et al. . |
| 4,323,597 | 4/1982 | Olson . |
| 4,384,911 | 4/1980 | Berg et al. . |
| 4,420,502 | 12/1983 | Conley . |
| 4,427,732 | 1/1984 | Gray, III et al. . |
| 4,455,205 | 6/1984 | Olson et al. . |
| 4,464,220 | 8/1984 | Beer . |
| 4,477,529 | 10/1984 | Campbell . |
| 4,478,876 | 10/1984 | Chung . |
| 4,486,504 | 12/1984 | Chung . |
| 4,491,508 | 1/1985 | Olson et al. . |
| 4,528,261 | 7/1985 | Hauser . |
| 4,543,275 | 9/1985 | Akashi et al. . |
| 4,548,884 | 10/1985 | Heiart . |
| 4,673,708 | 6/1987 | Rock et al. . |
| 4,792,492 | 12/1988 | Lee, Jr. . |
| 4,913,967 | 4/1990 | Bilhorn . |

FOREIGN PATENT DOCUMENTS

| | | |
|---|---|---|
| 0147061 | 7/1985 | European Pat. Off. . |
| 228671 | 7/1987 | European Pat. Off. . |
| 2705273 | 8/1978 | Germany . |
| 63-194779 | 6/1989 | Japan . |

OTHER PUBLICATIONS

U.S. application Ser. No. 484,467 filed Feb. 22, 1990 by Earl T. Crouch.
Article: Menezes et al "Commerical EB Curing Applications—A progress Repor" May 1985 Radiation Curing pp. 2 to 9.
Article: Ficket et al. "In situ UV Pattern Coating" 1985 Polymers, Laminations and Coatings Conference pp. 131 to 137.

*Primary Examiner*—P. C. Sluby

[57] ABSTRACT

A meshed for producing an abrasion-resistant, ultraviolet radiation cured coating on a surface of a polymeric substrate is disclosed, as well as the article produced from the method. The uncured coating material which is substantially free of non-reactive volatile components is (i) applied to the substrate (ii) heated along with the substrate to a temperature sufficient to drive a portion of the coating material into a region beneath the surface of the substrate, (iii) and cured onto the substrate by exposing the coating material under anaerobic conditions to sufficient ultraviolet radiation to cure the coating material. Heating of the solvent-free coating prior to ultraviolet radiation cure and while in contact with the substrate results in improved adhesion of the coating to the substrate.

6 Claims, 2 Drawing Sheets

# ACRYLIC COATED POLYCARBONATE ARTICLE

This is a divisional of application Ser. No. 07/482,438 filed on Feb. 20, 1990, now U.S. Pat. No. 5,271,968.

BACKGROUND OF THE INVENTION

1. Field of the Invention

This invention relates to a method for producing acrylic coated polycarbonate articles; and, more particularly, relates to an improved method for providing protective, ultraviolet radiation cured coating on the surface of a polycarbonate substrate.

2. Description of Related Art

Polycarbonate films generally have acceptable levels of strength and clarity but lack high levels of abrasion resistance and chemical resistance. Radiation curable acrylic coatings and methods for their application to polycarbonate substrates are known, see for example European Patent 228,671 corresponding to European Patent Application 86 117,682. While prior methods exist for applying radiation curable acrylic coatings to polycarbonate film, the adhesion of these cured coatings to the underlying polycarbonate can be less than desirable.

Some prior radiation curable acrylic coating compositions have employed amounts of non-reactive solvents to reduce the viscosity of the coating compositions during application thereof to the polycarbonate substrate. These non-reactive volatile components have been eliminated from the coatings by employing a forced hot air drying system. The use of coating compositions containing substantial levels of non-reactive, volatile components such as solvents, for example more than 1 percent by weight based on the total weight of the composition is not desired because of environmental and safety concerns. Thus there is a need for a method for producing coated polycarbonate articles which involves applying radiation curable coatings substantially free of non-reactive volatile components to polycarbonate substrates to produce coated articles exhibiting good coating adhesion.

Accordingly one object of the present invention is to produce primerless coated polycarbonate articles having high levels of adhesion between the cured coating and the polycarbonate substrate while avoiding the use of non-reactive volatile components such as solvents.

SUMMARY OF THE INVENTION

The present invention involves a method to produce a coated polycarbonate film exhibiting excellent adhesion between the cured coating and the underlying polycarbonate substrate. The method involves the steps of (i) applying an ultraviolet radiation (UV) curable coating composition which is substantially free of non-reactive volatile components, such as sol vents, to a surface of thermoplastic resin substrate; (ii) heating the uncured coating composition and the surface of the substrate to a temperature selected from between 90° F. and 150° F. to drive a portion of the uncured coating composition into a region beneath the surface of the thermoplastic resin substrate to create a coating composition penetrated region beneath the surface containing both thermoplastic resin and coating composition; and (iii) ultraviolet radiation curing of the applied coating composition by directing ultraviolet radiation into the coating composition and penetrated region. Upon UV curing of the coating composition, the penetrated region beneath the surface of the thermoplastic resin substrate provides an interlocking bond between the substrate and the cured coating.

DETAILED DESCRIPTION OF THE INVENTION

Figure 1:
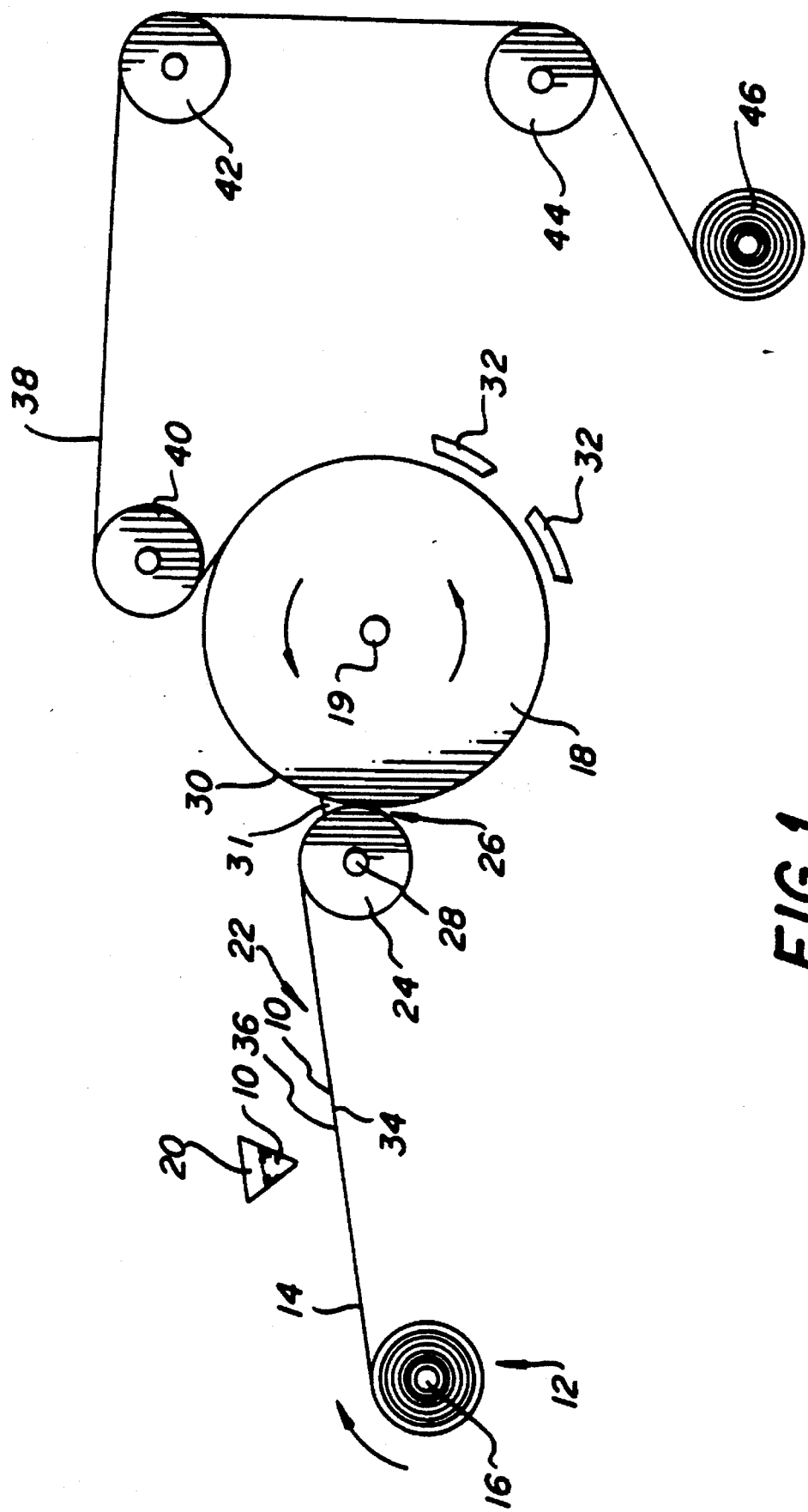
FIG. 1 is a horizontal elevational schematic view of equipment involving a casting drum for practicing the method of the present invention.

The method of the present invention provides an ultraviolet radiation-cured coating on the surface of thermoplastic resin substrates. The particular apparatus depicted in FIG. 1 is intended for the application and cure of a coating material on a continuous thermoplastic film substrate. The substrate is preferably made from a polycarbonate resin. The substrate employed in conjunction with the equipment of FIG. 1 should be flexible and capable of allowing the passage of ultraviolet radiant energy therethrough, and the properties of the polycarbonate substrate should not be unacceptably affected by such passage of radiant energy. The radiant energy source is selected to operate at an ultraviolet radiation frequency. A preferred polycarbonate substrate for the method of the present invention is one formed from a thermoplastic polycarbonate material, such as LEXAN® resin, a product of General Electric Company. Typical examples of polycarbonate resins are described bed in U.S. Pat. No. 4,351,920 which is incorporated herein by reference, and are obtained by the reaction of aromatic dihydroxy compounds with phosgene, as well as those obtained by the reaction of aromatic dihydroxy compounds with carbonate precursors such as diaryl carbonates. U.S. Pat. No. 4,351, 920 also describes various methods for the preparation of aromatic polycarbonate resins which may be used as substrates in the present invention. A preferred aromatic dihydroxy compound is 2,2-bis(4-hydroxy phenyl) propane, (Bisphenol-A). The term aromatic polycarbonate resins is meant to include polyester carbonates obtained from the reaction products of a dihydroxy phenol, a carbonate precursor and a dicarboxylic acid such as terephthalic acid and isophthalic acid. Optionally an amount of a glycol may also be used as a reactant. Polycarbonate film may be made by well-known methods. Typically, the molten polycarbonate is cast onto an extrusion roll stack, and both sides of the material are polished and pressed to a uniform thickness. Ultraviolet (UV) radiation is used as the energy source when curing coatings on the polycarbonate substrates. In the conjunction with the equipment of FIG. 1, the thickness of the polycarbonate film substrate may range from about 0.5 mil to about 30 mils, depending upon the ability of the substrate to remain flexible. Preferably the polycarbonate film has a thickness of from 5 to 20 mils.

The ultraviolet radiation-curable coating compositions are generally comprised of monomers and oligomers containing acrylic, methacrylic, and vinylic unsaturation as well as other 100% solids convertible materials (e.g. monomer-soluble polymers and elastomers, inorganic silica fillers and pigments and the like, etc.). The coating systems generally comprise monomers having molecular weights of from about 100 to 1000, and having single unsaturation or di-, tri-, or higher multifunctional unsaturation sites. In the practice of the present invention the coating is substantially free (<1%) of volatile, non-reactive components and preferably the coating compositions are 99 percent to 100 percent by weight reactive components and solid materials and more preferably are 99.9 percent to 100 percent by weight reactive components and solid materials and most preferably are 100 percent by weight reactive components and solid materials. The solid materials include non-volatile solid materials such as polymeric materials and colloidal silica Suitable polymeric materials include cellulose acetate butyrate. The coating composition is preferably 100% convertible to solids upon exposure to ultraviolet radiation. The coating composition may contain an amount of a latent UV screener such as resorcinol monobenzoate. The composition also contains an amount of a photo initiator effective to permit photocuring of the composition.

Figure 3:
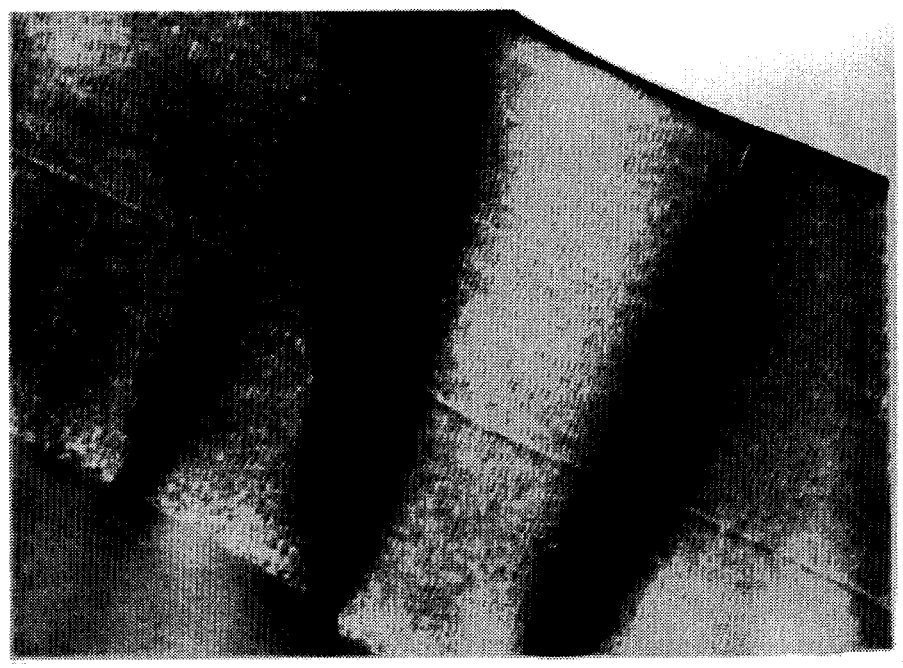
FIG. 3 is a cross sectional view of a coated polycarbonate article made according to the method of the present invention.

The preferred acrylic coating composition contains a substantial level of a relatively low molecular weight aliphatic alkane diol diacrylate which will penetrate, via diffusion, the region below the surface of polycarbonate substrate upon contact and exposure to elevated temperatures. A suitable aliphatic alkane diol diacrylate is 1,6-hexanediol diacrylate. A preferred acrylate coating composition contains from 5 percent to 60 percent by weight of an aliphatic alkane diol diacrylate based on the total weight of the coating composition. The aliphatic diol diacrylate preferably contains from 2 to 12 carbon atoms in the aliphatic portion thereof. Suitable aliphatic diol diacrylates include ethylene glycol diacrylate, butane diol diacrylate, hexane diol diacrylate, octane diol diacrylate, decane diol diacrylate. A preferred coating composition contains about 37 percent by weight trimethylolpropane triacrylate (TMPTA), about 15 percent by weight dipentaerythritol monohydroxy pentacrylate (DIPEPA) 37 percent by weight 1,6-hexanediol diacrylate, about 9 percent cellulose acetate butyrate (CAB) and about 2 percent by weight of the photoinitiator, diethoxyacetophenone (DEAP). A preferred silica filled acrylic coating employs a mixture of 22 percent 1,6-hexanediol diacrylate, 22 percent trimethylolpropane triacrylate, 35 percent functionalized colloidal silica, 7 percent of a latent ultraviolet radiation absorber such as benzene sulfonate ester of Cyasorb® 5411 (BSEX) as described by D. R. Olson, J. Applied Polymer Science 28, 1983, p. 1159 incorporated herein by reference and 3 percent of a photoinitiator such as diet hoxyacetophenone (DEAP). Suitable functionalized colloidal silica is set forth in Olson et al, U.S. Pat. No. 4,455,205; Olson et al, U.S. Pat. No. 4,491,508; Chung, U.S. Pat. No. 4,478,876 and Chung, U.S. Pat. No. 4,486,504 incorporated herein by reference. The aliphatic alkane diol diacrylate, and more particularly 1,6-hexanediol diacrylate by virtue of its ability to readily swell a thermoplastic matrix such as polycarbonate, facilitates quick and adequate penetration and diffusion of a sufficient amount of the coating composition into the region beneath the surface of the substrate to promote adhesion between the coating and the substrate upon curing of the coating composition. FIG. 3 show an article made according to the present invention which has a cured acrylic coating and a polycarbonate substrate wherein the substrate has a region adjacent its surface which serves to improve adhesion between the coating composition and the substrate.

DETAILED DESCRIPTION OF THE DRAWINGS

A suitable apparatus for applying and curing a coating on the surface of a polymeric substrate in accordance with the method of the present invention is depicted in FIG. 1. In FIG. 1, radiation-curable coating material 10 is continuously applied by flowing it onto the surface of the film at a controlled rate.

Substrate roll 12 is formed from a roll of uncoated substrate 14 surrounding a core 16. Substrate 14 is unwound pursuant to the movement of casting drum 18 (described below). Coating material 10 may be applied to the surface of substrate 14 by dripping of the material onto the substrate 14 by use of an applicator 20. It will be apparent to those skilled in the art that adjustments may be made in the coating system in order to apply the coating to the substrate efficiently. Coating material 10 may be applied to substrate 14 by any of a number of well-known coating methods, such as spraying, brushing, curtain coating, and dipping, as well as other well-known roll coating methods, such as reverse roll coating, etc. The thickness of radiation-curable coating 10 applied to the substrate and the thickness of the resultant cured harcoat 21 is dependent upon the end use of the article and the physical properties desired, and their thickness may range from about 0.05 mil to about 5.0 mils for the non-volatile coating. The preferred thickness is from about 0.2 mil to about 0.5 mil.

After coating material 10 is applied to substrate 14, the coated substrate 22 is guided to nip roll 24. The choice of materials which form the nip roll 24 used in the present invention is not critical. The rolls may be made of plastic, metal (i.e. stainless steel, aluminum), rubber, ceramic materials, and the like. Nip roll 24 may be provided with a sleeve, preferably formed from a resilient material such as tetrafluoroethylene or polypropylene, or from one of the variety of currently available synthetic rubber compounds and blends thereof. The sleeve is snugly fitted over the roll surface to provide a smooth, friction-minimizing surface for contacting substrate 22. Nip roll 24 is adjustable relative to the position of casting drum 18, described below, and may optionally be independently driven.

As shown in FIG. 1, casting drum 18 is situated in a position adjacent nip roll 24, such that the outer circumferences of nip roll 24 and drum 18 are adjacent to each other at an interface defining a nip 26 which is described below. The applied pressure at the interface of nip roll 24 and drum 18 may be adjusted by well known methods, such as air cylinders (not shown), attached to the axle 28 of nip roll 24, which selectively urges the roll toward drum 18. Typically, the applied pressure at the interface is slight, i.e. less than 5 pounds per linear inch, when the substrate is not passing through nip 26. The applied pressure can be readjusted according to a variety of parameters when a substrate having a coating thereon is passing through nip 26, as described below.

Casting drum 18 surrounds central axle 19, and is preferably made from a material which is conductive to heat, and preferably comprised of stainless steel or chromium-plated steel. Furthermore, it is preferred that the drum be independently driven by an outside power source (not shown).

Casting drum surface 30 may be provided with a wide variety of textures or patterns, depending upon the texture or pattern desired to be imparted to coating 10 and the resultant hardcoat 21. For instance, surface 30 may be provide with a highly polished chrome-plated surface if a high degree of gloss is desired for the hardcoat 21. If a lower sheen is desired for the hardcoat 21, surface 30 may be less polished so as to provide a matte texture to the coating. Similarly, a design pattern may be embossed on surface 30 to impart a mirror-image design pattern to hardcoat 21. The cured coating will create a hardcoat 21 which will thus become a permanent mirror-image of casting drum surface 30.

Although a nitrogen blanket may be employed to ensure an anaerobic cure of the coating composition it is preferred that an anaerobic cure be obtained without the use of such a nitrogen blanket. In order to minimize the presence of air in the coating 10 prior to curing, without the use of a nitrogen gas blanket, the pressure capable of being exerted at nip 26 is carefully adjusted. The adjustment of applied pressure at nip 26 may be accomplished as described above. To obtain a certain coating thickness the exact pressure that will be exerted at nip 26 will depend on factors such as the viscosity of coating 10, the substrate speed, the degree of detail in the design pattern on surface 30 (if present), and temperature of the casting drum. Typically, for a substrate having a thickness of 15 mils having applied thereon an acrylic-based coating having a thickness of 0.6 mil and a viscosity of 220 centipoises, at a substrate speed of 50 feet per minute and a roll cover of 55 durometer hardness (Shore A) a nip pressure of 25 pounds/linear inch is applied to the coated substrate. Coating 10 is thereby pressed into contact with both substrate 22 and casting drum surface 30, thereby ensuring that there is a substantial absence of free diatomic oxygen from the coating during curing, so as the ensure a substantially complete curing of the coating and a cured coating, hardcoat 21, exhibiting a mirror image of the texture and/or pattern of casting drum surface 30. Excess coating forms a bead 31 of uncured coating composition material above the nip and across the width of the drum. This bead 31 ensures that adequate coating material enters through the nip 26 across the width of the drum.

After substrate 22 having coating 10 applied thereon passes through nip 26, the coating is cured by means of ultraviolet radiant energy. As shown in FIG. 1, means 32 for transmitting ultraviolet radiation energy transmit to ultraviolet radiation energy into a surface 34 of substrate 22 opposite a surface 36 having coating 10 thereon. The radiant energy passes through the transparent substrate 22 and is absorbed by the coating 10, the latter being compressed between substrate 22 and drum surface 30. The preferred wavelength of the UV radiation is from about 2900 Angstroms to about 4050 Angstroms. The lamp system used to generate such UV radiation may consist of discharge lamps, e.g. xenon, metallic halide, metallic arc, or high, medium, or low pressure mercury vapor discharge lamps, etc., each having operating pressures of from as low as a few millitorrs up to about 10 atmospheres. The radiation dose level applied to coating 10 through substrate 22 may range from about 2.0 J/cm$^2$ to about 10.0 J/cm$^2$. A typical UV curing system suitable for the present invention is a Linde medium pressure mercury lamp, as described in U.S. Pat. No. 4,477,529. The number of lamps directing UV light to the surface of the substrate is not critical; however, a greater number of lamps may allow a higher production rate for the substrate having coating 10 thereon. Typically, two lamps, each producing 300 watts/linear inch of radiant energy, are sufficient for an acrylic-based coating having a thickness of about 0.5 mils, when the production line speed is approximately 50 feet/minute. Such a curing procedure should result in both the polymerization of the polyfunctional acrylic monomers and the cross-linking of the polymers to form hard, non-tacky coatings. The coating may receive the post curing by further exposure to ultraviolet radiation after leaving the surfaces of the casting drum.

After the layer of coating material has been applied to and cured on substrate 22 according to the method of the present invention, the resulting product is a hardcoated polycarbonate film article 38 which is guided around idler rolls 40, 42 and 44 then collected on take-up roll 46, the latter typically being independently driven and capable of separating the hardcoated polycarbonate article 38 from drum surface 30.

The improvement of the present invention involves heating the polycarbonate substrate 22 and uncured coating composition 10 to a temperature of from between 90° F. and 150° F. prior to curing of the coating composition 10. While prior coating methods have employed drying systems to remove non-reactive volatiles, including solvents, from the coatings, such drying systems purpose has been to remove non-reactive volatiles and there is no apparent reason why anyone skilled in the art would have heretofore employed such a system for coating compositions which are substantially free of non-reactive volatiles. In the method of the present invention, the applied coating composition 10 needs to be in contact with thermoplastic resin substrate 22 for a sufficient period of time after application of the coating composition 10 and prior to cure thereof and at a sufficient temperature, to cause a sufficient amount of the coating composition to diffuse into a region 47 beneath the surface 34 of the thermoplastic resin substrate 22. Preferably the coating composition 10 penetrates beneath the surface to a depth of from 0.05 microns to 5 microns, more preferably from 0.1 microns to 1 micron and to create a region 47 containing both thermoplastic resin and coating composition. The region 47 is located adjacent the coated surface 34 of the substrate. Preferably the substrate 22 and coating composition 10 are kept in contact at an elevated temperature of from 90° F. to 150° F. for a period of from 1 to 5 seconds. The heating step is not significantly involved in the curing of the coating composition. Upon curing of the coating 10, the penetrated region 47 provides an interlocking matrix of thermoplastic resin and cured coating 21 which locks the coating 10 and the substrate 22 together to improve adhesion therebetween. The step of heating the substrate 22 and coating 10 prior to ultraviolet radiation curing of the coating composition 10 can be accomplished by internally heating drum 18. The drum can be heated internally by hot oil or the like (not shown). The coating composition of the present invention are radiation curable rather than heat curable compositions.

It will be understood by those skilled in the art that a nitrogen blanket may be used alone or in conjunction with the apparatus and preferred methods of the present invention.

The following specific example describes the novel methods and articles of the present invention. It is intended for illustrative purposes of specific embodiments only and should not be construed as a limitation upon the broadest aspects of the invention.

Figure 2:
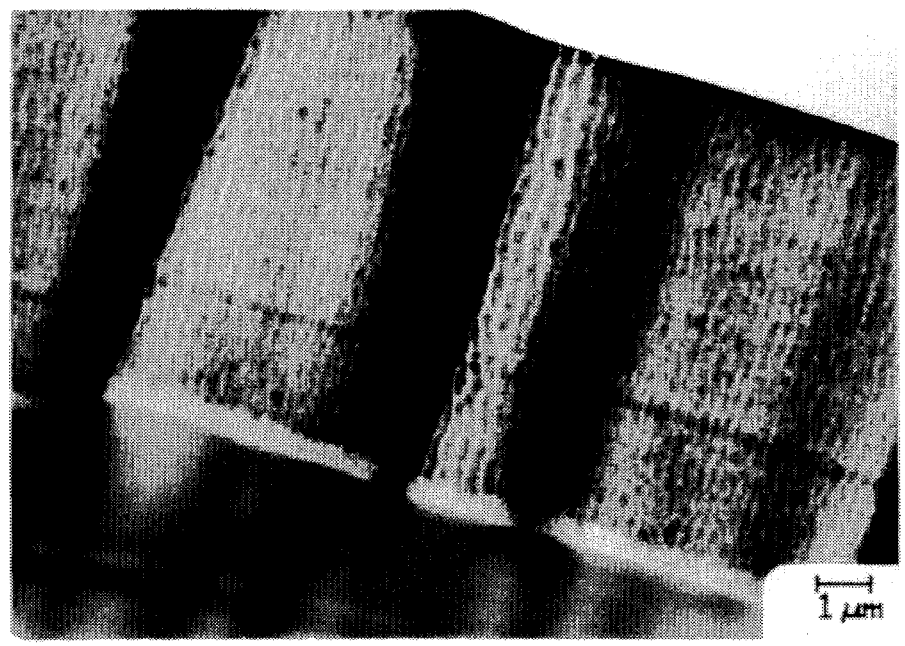
FIG. 2 is a cross-sectional view of a coated polycarbonate article made without a heated casting drum.

FIG. 2 is a cross-sectional view of a coated article 48 made without a heated casting drum. Note that the coating composition did not penetrate a region beneath the surface 52 of the polycarbonate substrate 51 and thus did not provide a region to lock the cured coating so to the substrate 51.

FIG. 3 is a cross-sectional view of a coated polycarbonate article 38 made according to the method of the present invention. Note that the article 38 of FIG. 3 has a region beneath the surface of the substrate into which an amount of the coating composition has migrated. Upon curing, the region acts to interlock the cured coating and the polycarbonate substrate.

EXAMPLES

The following examples illustrate the improved method of the present invention. Example A is a comparative example and Example B is an example of the improved adhesion obtained by articles made from the process of the present invention.

TABLE 1

| Examples[a] | Cure Speed (feet/minute) | Roll Temp. °F. | Scribed Adhesion Tape Test |
|---|---|---|---|
| A | 20 | 70 | Failed |
| B | 20 | 115 | Passed |

[a]The coating compositions of Examples A and B were obtained by adding 0.75 grams of BSEX (benzene sulfonate ester of Cyasorb ® 5411 # a benzotriazole) and 0.3 grams of DEAP (diethoxyacetophenone) to 10 grams of a mixture of 37.3 grams of HDDA (hexanediol diacrylate), 37.3 grams of TMPTA (trimethylol propane triacrylate), 14.7 grams of DiPEPA (dipentaerythritol monohydroxy pentacrylate), 2.1 grams of DEAP (diethoxyacetophenone) and 8.6 grams of CAB (cellulose acetate butyrate).

We claim:

1. A coated aromatic polycarbonate article, said article comprising:

a) an ultraviolet radiation cured acrylic coating material layer having a thickness of from 0.5 to 5 mils;

b) an aromatic polycarbonate resin substrate said substrate having a penetrated region beneath the surface of the substrate adjacent said coating, said region comprising ultraviolet radiation cured coating material and aromatic polycarbonate resin, said region having a thickness of from between 0.1 micron and 5 microns, said cured coating being directly adhered to said substrate by heating the uncured coating composition and the surface of the substrate to a temperature selected from between 90° F. and 150° F. and ultraviolet radiation curing the applied coating material and the penetrated region whereby an interlocking bond between the substrate and the cured coating is formed.

2. The article of claim 1 wherein the coating material is substantially free of volatile, non-reactive components.

3. The article of claim 1 wherein the applied coating material contains a latent ultraviolet screener.

4. The article of claim 1 wherein the coating material contains a silica filler.

5. The article of claim 1 wherein the substrate is a film.

6. The article of claim 5 wherein the film has a thickness of from 0.5 rail to about 30 mils.

* * * * *